April 26, 1955  E. CARTER  2,706,857
MEASURING WHEELS AND MACHINES
Filed Dec. 16, 1952  4 Sheets-Sheet 1
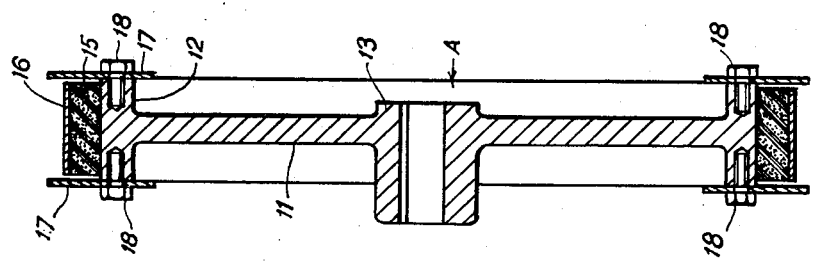
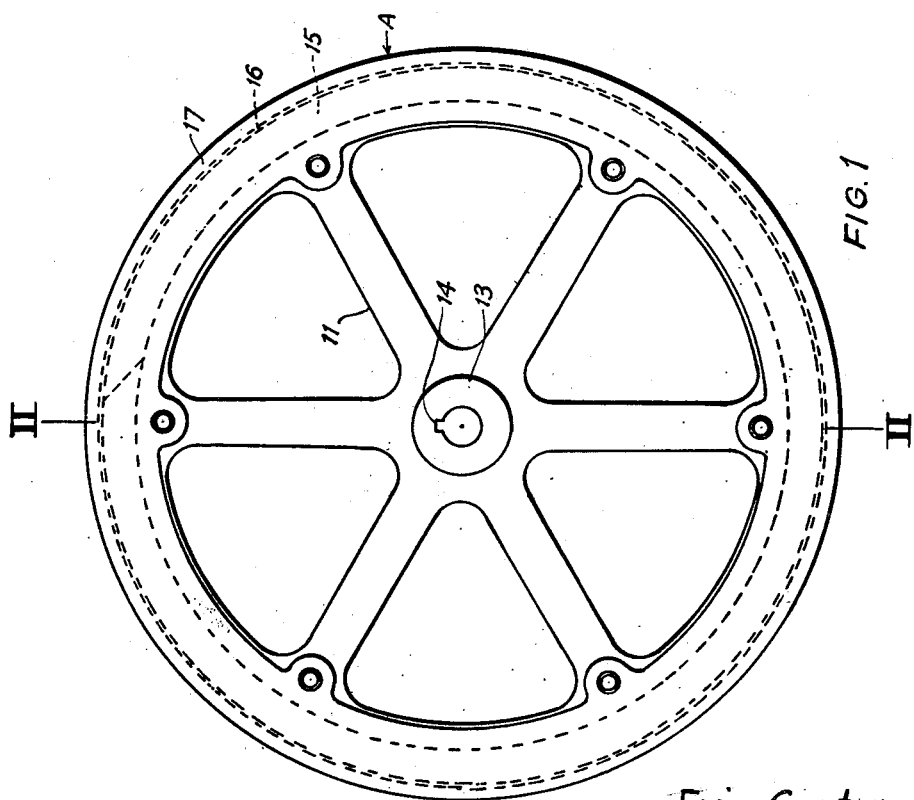
Eric Carter
Inventor
by  *Attorney*

April 26, 1955  E. CARTER  2,706,857
MEASURING WHEELS AND MACHINES
Filed Dec. 16, 1952  4 Sheets-Sheet 4

Eric Carter
Inventor
by  STC Bierman
Attorney

United States Patent Office 2,706,857
Patented Apr. 26, 1955

2,706,857

MEASURING WHEELS AND MACHINES

Eric Carter, Bury, England, assignor to B. & F. Carter & Co. Limited, Bolton, England Application December 16, 1952, Serial No. 326,283

5 Claims. (Cl. 33—129)

This invention concerns measuring wheels and machines incorporating such wheels.

It is known to measure the length of a strip or piece of material such as rope, wire, tape, fibre, cord, electric cable and the like by causing it to move past and contact the periphery of a wheel, thereby turning the wheel as the strip or piece progresses. The wheel is adapted, as it turns, to operate an indicating means which is arranged to show the linear length of material passing the contact point. The peripheral surfaces of such wheels have previously been of non-resilient nature and it has been found that inaccuracies of measurement have occurred due to slip. It is though that this is in part due to the fact that where the peripheral surface of the wheel is of a non-resilient nature insufficient contact between the material and the wheel is obtained, with consequent reduction of the frictional torque.

The object of the present invention is to provide a measuring wheel which gives consistent results of a high accuracy, and an improved measuring machine incorporating such a wheel.

According to the present invention a measuring wheel of the type adapted to be mounted for rotation by the contact, with the periphery thereof, of a travelling strip or piece of material such as, for example, cable or tape, the consequent rotary movement of the wheel being transmitted to a device which accordingly registers the linear length of material passed, is characterised in that the peripheral region of the wheel is resilient.

The invention also includes a machine including such a wheel, guide means being provided to conduct said material past a part of the periphery of said measuring wheel, and a counter, driven by said wheel, being adapted to register the length of material passed.

The invention will now be described further by way of example with reference to the accompanying drawings in which:

Figure 1 is an elevation of a measuring wheel constructed in accordance with the invention;

Figure 2 is an end view on the line II—II of Figure 1;

Figure 3:
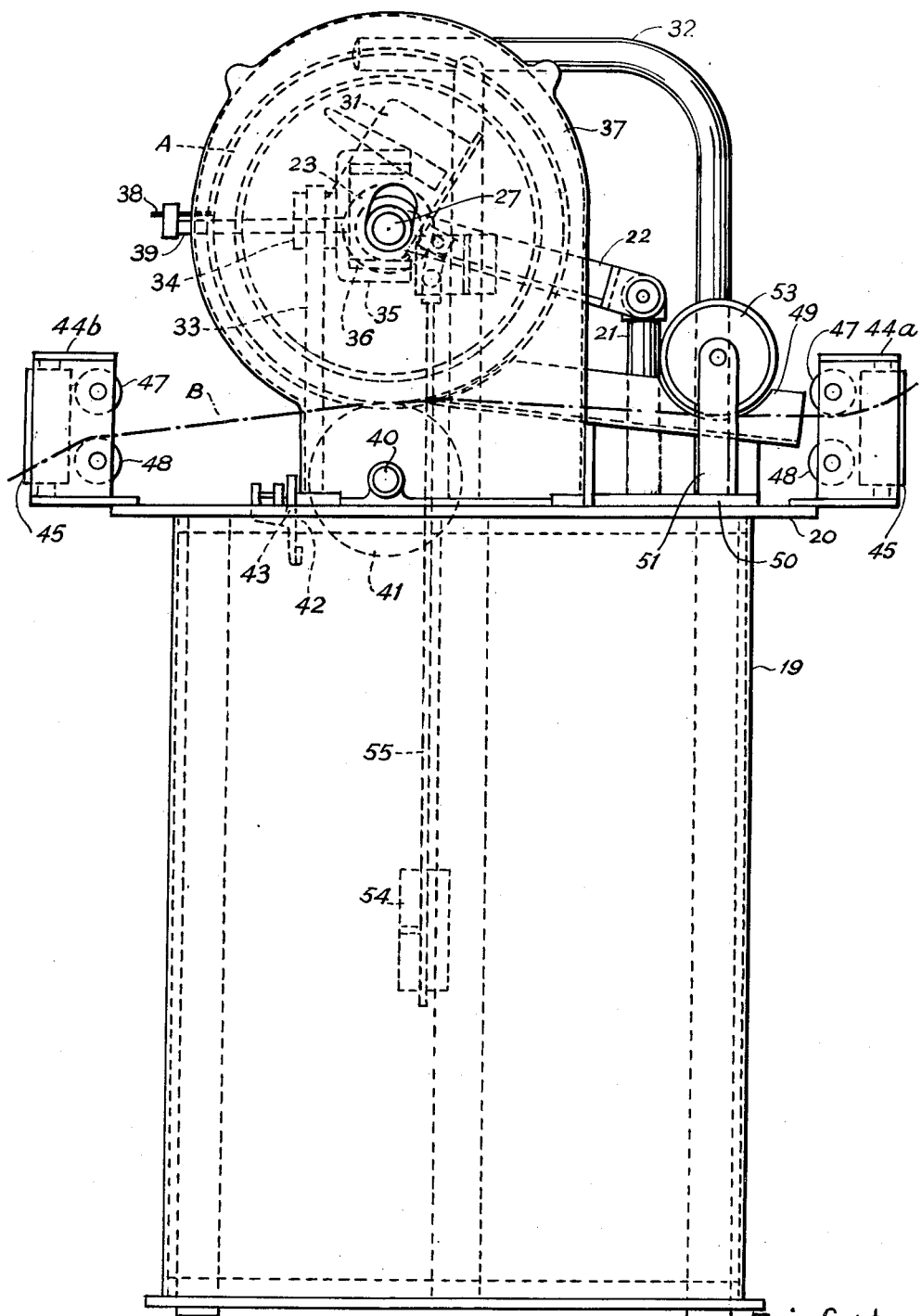
Figure 3 is a front elevation of a measuring machine incorporating the measuring wheel shown in Figures 1 and 2.

The measuring wheel A illustrated (Figs. 1 and 2) consists of a light alloy spider 11, 10¼" diameter and having a peripheral rim 12, 1⅝" wide. The boss 13 of the spider 11 has a ½" bore with a longitudinal key-way 14 therein. A layer of 1" thick sponge rubber 15 is applied around the rim 12 of the wheel and is fixed in position by means of a suitable adhesive. A 28 S. W. G. hardened and tempered steel band 16 encircles the sponge rubber 15 and compresses it to a thickness of approximately ⅝". The band 16 has its ends jointed in a suitable manner, for instance by riveting. At each side of the rim 12 of the spider 11 is bolted an annular metal flange 17 which extends above the peripheral surface of the rim 12 for about 1", that is to say well beyond the surface of the steel band 16. These flanges 17 are secured in position by means of bolts 18 screwed into tapped holes in the spider 11. The circumference of the wheel A, measured at the surface of the steel band 16, is 36³⁵⁄₃₂".

Figure 4:
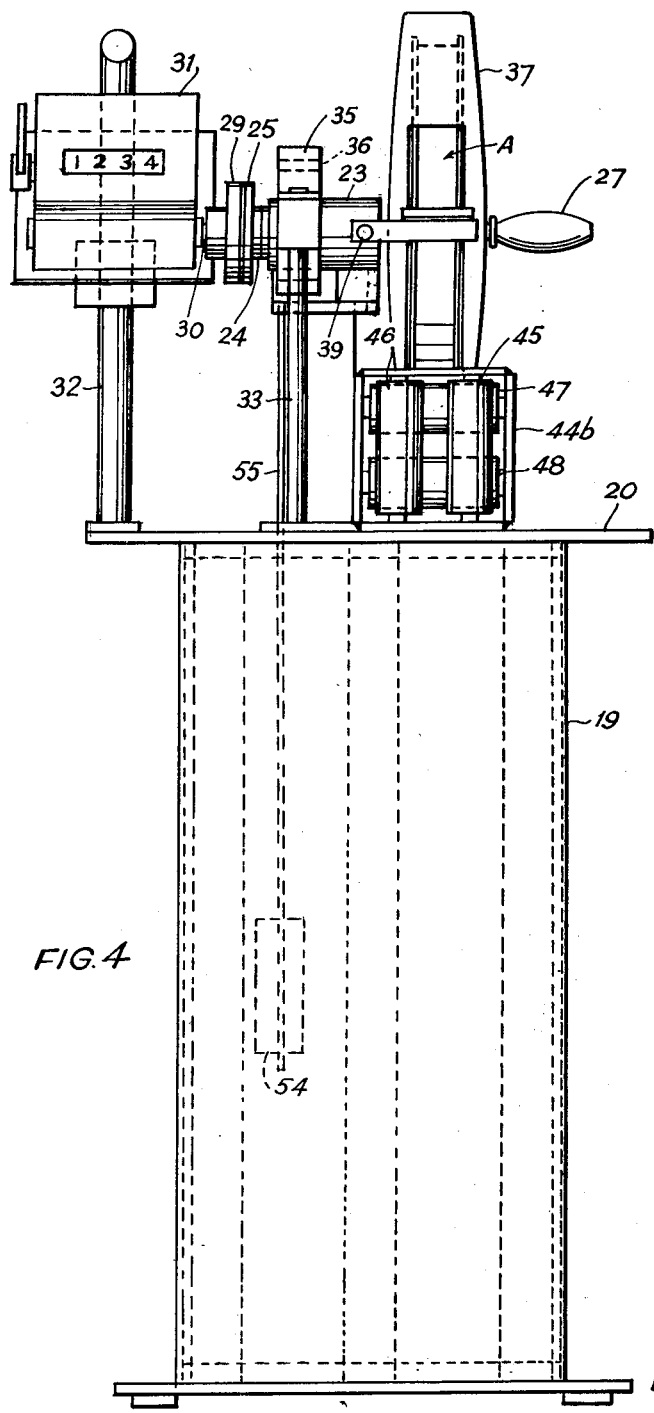
Figure 4 is an end elevation corresponding to Figure 3.
Figure 5:
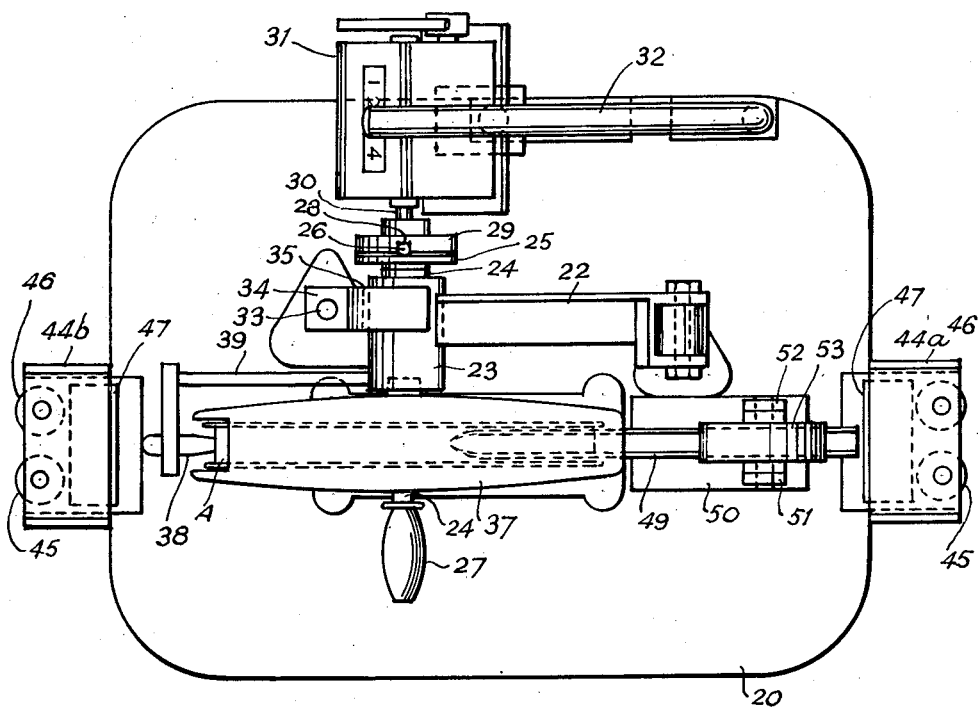
Figure 5 is a plan view corresponding to Figure 3.

The wheel A is utilized in a measuring machine (Figs. 3, 4 and 5).

The machine has a stand 19, the upper surface of which acts as a table 20. Fixed to the table 20 is a vertical pillar 21 having pivotally mounted to the upper end thereof an arm 22 lying longitudinally of the table 20 in its substantially horizontal position, the other end of the arm 22 then extending above the centre part of the table 20. This end of the arm 22 has welded thereto a suitable bearing 23, preferably including ball or roller bearing members, in which is journalled, transversely of the table 20, a spindle 24. The spindle 24 extends from the bearing 23 at both ends thereof. On one end of the spindle 24 is fixedly mounted, by means of a key, the measuring wheel A, whilst the other end of the spindle 24 terminates in an enlarged disk-like portion 25 on the face of which is, eccentrically carried, a pin 26. The pin 26 co-operates with a slot 28 diametrically disposed in the face of a similar disk-like portion 29 provided on the end of the shaft 30 of a mechanical counter 31 which is mounted on a crank arm 32 also affixed to the table 20 of the machine. That end of the spindle 24 carrying the measuring wheel A is further extended to provide a handle 27.

A further pillar 33 fixed to the machine table 20 has slidably disposed thereon a block 34 which carries a channel iron 35 the limbs of which extend above and below the bearing 23 respectively. Each inner surface of the limbs has secured thereto a layer 36 of soft resilient material such as felt or rubber. The bearing 23 is accommodated between these limbs with a large clearance, and the block 34 is adjustable on the vertical pillar 33 so that the relative position of the channel iron 35 and the bearing 23 can be altered.

The measuring wheel A is enclosed in a case metal guard 37 which roughly follows the shape of the wheel and is bolted to the machine table 20. The guard 37 is cut away at one side to allow a doctor or scraper 38 held by an arm 39 welded to the bearing 23 to engage the peripheral surface of the measuring wheel A.

In its operative position the wheel is spaced from the machine table 20 by a distance of about 3". Immediately below the lowermost part of the wheel A there is rotatably supported in bearings 40 fixed to the machine table 20 a roller 41, of diameter approximately 5". The machine table 20 is cut away to accommodate the roller which is of short axial length, enabling it to run, if necessary, within the side flanges 17 of the measuring wheel A. An adjustable doctor 42 is provided, held in a bracket 43 fixed to the machine table 20, so as to engage with the periphery of the roller 41.

At the ends of the machine table 20 are provided inlet roller box 44a and outlet roller box 44b each having rotatably supported therein a pair of rollers 45, 46 side by side with their axes vertical and then a pair of rollers 47, 48 one above the other and closely adjacent to the first pair of rollers 45, 46 with their axes horizontal. It is preferable that the spacing of the rollers should be adjustable.

Between the inlet roller box 44a and the measuring wheel A is provided a V- or U-shaped guide channel 49, supported on a base 50 fixed to the machine table 20. The channel 49 is of substantial depth compared with its width, which is somewhat less than the width of the measuring wheel A, and a pair of pillars 51, 52, carry each side thereof a rotatable auxiliary guide wheel 53, the height of which above the bottom of the channel 49 can preferably be adjusted. The channel sides are cut away to accommodate this auxiliary guide wheel 53. One end of the channel 49 is closely adjacent to the rollers 47, 48 of the roller box 44a, whereas the other end of the channel 49 is shaped to correspond with the periphery of the measuring wheel A where it approaches its lowermost point, thus enabling the channel 49 to be brought into close proximity with said periphery.

A weight 54 is suspended from the arm 22 which supports the bearing 23 by means of a rod 55, the lower end of which is accommodated within the machine stand 19.

The sides of the guard 37 are slotted to allow for up and down movement of the spindle 24 of the measuring wheel A and thus the wheel itself, the internal dimensions of the guard 37 being sufficient to allow such movement.

In use, the axes of the measuring wheel A and the roller 41 being substantially in vertical alignment, it will be appreciated that owing to its own weight and that of the weight 54 the measuring wheel A will tend to move into contact with the roller 41, the point of contact being at the lowermost point of the measuring wheel periphery and the uppermost point of the roller periphery. If, therefore, a length or strip of material which it is desired to measure (for instance an electric cable B) is passed between the inlet rollers, which are suitably adjusted, and which are arranged so that the approach angle of the cable may be widely varied, along the base of the channel 49 beneath the auxiliary guide wheel 53, which is also suitably adjusted, between the measuring wheel A and the guide roller 41, and out through the outlet rollers the measuring wheel A will rest on the cable so as to grip it lightly between itself and the guide roller 41.

The handle 27 of the spindle 24 of the measuring wheel A is provided to facilitate the lifting of the measuring wheel clear of the guide roller 41, whilst the cable B is introduced to the machine. The channel iron 35 is provided, and is of such size, and is so disposed, so that when manipulating the measuring wheel the bearing will abut one or other of the soft resilient surfaces 36 before the measuring wheel periphery comes into contact with either the internal surface of the guard 37 or the guide roller 41. Thus is prevented any damage to the sensitive periphery of the measuring wheel. The scrapers 38, 42 are provided to maintain the periphery of both measuring wheel A and guide roller 41 in a clean condition.

In operation the cable B is drawn through the machine by a power drive. Owing to the contact of the cable B with the measuring wheel periphery the measuring wheel A is rotated, and the rotation transmitted to the counter 31 via the pin and slot coupling 27, 28. This coupling is provided so that the drive is still transmitted even when there is misalignment of the spindle 24 of the measuring wheel A and the shaft 30 of the counter 31 as occurs when certain diameters of cable are being measured.

Owing to the downward weight of the measuring wheel A and the weight 54, and to the resilient surface of the measuring wheel at the point of contact of the periphery of the wheel and the cable B there is a slight deformation of the former which substantially increases the area of contact compared with what it would be if a measuring wheel having a rigid periphery were used. It has been found that this factor substantially eliminates slip between the measuring wheel A and the cable B and that the indicated measurement on the counter 31 of the linear length of cable passing is extremely accurate. It has been found necessary, owing to the slight deformaation which occurs, that the circumference of the measuring wheel A be slightly in excess of its theoretical magnitude. For instance, in the particular machine being described, the circumference although measuring 36%2″, in practice one revolution of the wheel corresponds to one yard exactly of cable passing.

The invention of course is not limited to the specific details of construction above described. Any suitable type of counter may be employed and it may be geared or otherwise arranged to read in feet, metres, inches, yards and so forth. Again the coupling may be of any other suitable type which permits drive to be transmitted in spite of misalignment. The resilient periphery of the measuring wheel has been described as being of sponge rubber but there are numerous other resilient materials, for instance suitable synthetic resins, which could be used. The cable, instead of being passed beneath the lowermost part of the measuring wheel could be passed above the measuring wheel which could then have a spindle fixed at a given height. A guide roller would then have to be provided above the measuring wheel and this guide roller would be adjustable in height to allow for cables of varying diameter. In short, numerous minor modifications could be made by a person skilled in the art, whilst the construction would still fall within the scope of the appended claims.

I claim:

1. A measuring wheel adapted to be mounted for rotation by contact of its periphery with a travelling length of material, the consequent rotary movement of the wheel being registered so as to determine the linear length of material passed, comprising a rim, an annular resilient non-metallic layer secured around said rim and in direct contact with said rim, and a circular band of flexible metal secured around said resilient material so as to effect a degree of precompression thereof, whereby in use slight deformation of said wheel takes place.

2. A measuring wheel adapted to be mounted for rotation by contact of its periphery with a travelling length of material, the consequent rotation of the wheel being registered so as to determine the linear length of material passed, comprising a rim, a layer of sponge rubber secured around said rim, a metal band secured around said layer of sponge rubber so as to effect a degree of precompression thereof and side flanges fitted to said rim effective to prevent lateral expansion of said rubber, whereby in use slight deformation of said wheel takes place.

3. A machine for measuring the length of a travelling piece of material passing a given point comprising a stand, a spindle mounted transversely of said stand, a measuring wheel including a rim having a layer of sponge rubber secured there-around and a metal band secured around said layer of sponge rubber so as to effect a degree of precompression thereof mounted for rotation on the spindle, means for conducting said material past and in contact with the periphery of said measuring wheel, whereby in use slight deformation of said wheel takes place, and indicator means adapted to register the rotary movement of said wheel.

4. A machine for measuring the length of a travelling piece of material passing a given point comprising a stand, a spindle, a measuring wheel rotatably mounted on said spindle, a rim on said wheel, a layer of sponge rubber secured around said rim, a metal band secured about said layer of sponge rubber so as to effect a degree of precompression thereof, whereby in use slight deformation of said wheel takes place, an arm carrying at one end thereof said spindle and pivotally mounted at its other end to said stand so as to enable said spindle and said wheel to assume varying heights above said stand according to the cross-sectional size of said material, means for conducting said material past and in contact with the periphery of said measuring wheel including a roller adapted to support said material against said metal band, indicator means for recording the rotation of said measuring wheel, and adjustable stop means adapted to co-operate with said arm so as to prevent said measuring wheel contacting said roller when no material is therebetween.

5. A machine for measuring the length of a travelling piece of material passing a given point comprising a stand, a spindle, a measuring wheel rotatably mounted on said spindle, a rim on said wheel, a layer of sponge rubber secured around said rim, a metal band secured about said layer of sponge rubber so as to effect a degree of precompression thereof, side flanges fitted to said rim effective to prevent lateral expansion of said rubber, an arm carrying at one end thereof said spindle and pivotally mounted at its other end to said stand so as to enable said spindle and said wheel to assume varying heights above said stand according to the cross-sectional size of said material, whereby in use slight deformation of said wheel takes place, means for conducting said material past and in contact with the periphery of said measuring wheel including a roller adapted to support said material against said metal band, indicator means for recording the rotation of said measuring wheel, and adjustable stop means adapted to co-operate with said arm so as to prevent said measuring wheel contacting said roller when no material is therebetween.

References Cited in the file of this patent

UNITED STATES PATENTS

| | | |
|---|---|---|
| 267,826 | Bell | Nov. 21, 1882 |
| 280,547 | Williams | July 3, 1883 |
| 297,706 | Morrison | Apr. 29, 1884 |
| 597,836 | Carpenter | Jan. 25, 1898 |
| 1,323,402 | McMillan | Dec. 2, 1919 |
| 1,481,980 | Bostic | Jan. 29, 1924 |
| 1,652,407 | Johnson | Dec. 13, 1927 |
| 2,136,457 | Nixon | Nov. 15, 1938 |
| 2,154,621 | Jenkins | Apr. 18, 1939 |
| 2,163,402 | Mason | June 20, 1939 |
| 2,494,732 | Weber | Jan. 17, 1950 |